United States Patent
Matsuoka et al.

(10) Patent No.: US 10,601,274 B2
(45) Date of Patent: Mar. 24, 2020

(54) 10-POLE/9-SLOT SYNCHRONOUS MOTOR

(71) Applicant: Mitsubishi Electric Corporation, Tokyo (JP)

(72) Inventors: Atsushi Matsuoka, Tokyo (JP); Kazuhiko Baba, Tokyo (JP); Hiroki Aso, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 295 days.

(21) Appl. No.: 14/787,783

(22) PCT Filed: May 20, 2014

(86) PCT No.: PCT/JP2014/063321
§ 371 (c)(1),
(2) Date: Oct. 29, 2015

(87) PCT Pub. No.: WO2014/196353
PCT Pub. Date: Dec. 11, 2014

(65) Prior Publication Data
US 2016/0087498 A1    Mar. 24, 2016

(30) Foreign Application Priority Data

Jun. 3, 2013    (WO) .................. PCT/JP2013/065330

(51) Int. Cl.
*H02K 3/18* (2006.01)
*H02K 21/16* (2006.01)
(Continued)

(52) U.S. Cl.
CPC ................. *H02K 3/18* (2013.01); *H02K 1/02* (2013.01); *H02K 1/146* (2013.01); *H02K 3/28* (2013.01);
(Continued)

(58) Field of Classification Search
CPC .. H02K 1/06; H02K 1/08; H02K 1/14; H02K 1/146; H02K 21/00; H02K 21/12; H02K 21/14; H02K 21/16
(Continued)

(56) References Cited

U.S. PATENT DOCUMENTS 8,648,513 B2   2/2014   Nakano et al.
2004/0119363 A1   6/2004   Tanaka et al.
(Continued)

FOREIGN PATENT DOCUMENTS

CN    1220319 C    9/2005
JP    62-110468 A    5/1987
(Continued)

OTHER PUBLICATIONS

Machine translation of JP 2007-259541 A.*
(Continued)

*Primary Examiner* — Quyen P Leung
*Assistant Examiner* — Minki Chang
(74) *Attorney, Agent, or Firm* — Posz Law Group, PLC (57) ABSTRACT

A 10-pole/9-slot synchronous motor includes nine teeth that are divided into three phases, each having three adjacent teeth. A stator iron core is configured such that a value obtained by dividing b by a is larger than 0.5 where the a is a width of a teeth tip, which is provided on an inner diameter side of a tooth of the teeth formed on the stator iron core, from a base portion between the teeth tip and the tooth to a circumferential end of the teeth tip and the b is a thickness of the teeth tip from the base portion to an inner-diameter side surface of the teeth tip.

5 Claims, 9 Drawing Sheets

(51) Int. Cl.
*H02K 29/03* (2006.01)
*H02K 1/02* (2006.01)
*H02K 1/14* (2006.01)
*H02K 3/28* (2006.01)

(52) U.S. Cl.
CPC ............. *H02K 21/16* (2013.01); *H02K 29/03* (2013.01); *H02K 2213/03* (2013.01)

(58) Field of Classification Search
USPC ... 310/162, 179, 216.001, 216.069, 216.091, 310/216.111, 216.112
See application file for complete search history.

(56) References Cited

U.S. PATENT DOCUMENTS

| | | | | |
|---|---|---|---|---|
| 2010/0117476 A1 | * | 5/2010 | Clark | H02K 1/278 310/156.47 |
| 2010/0244605 A1 | | 9/2010 | Nakano et al. | |
| 2011/0025156 A1 | * | 2/2011 | Groening | H02K 49/06 310/93 |
| 2014/0070655 A1 | * | 3/2014 | Schneider | H02K 1/272 310/156.49 |

FOREIGN PATENT DOCUMENTS

| | | | |
|---|---|---|---|
| JP | 09-172762 A | | 6/1997 |
| JP | 2001-045682 A | | 2/2001 |
| JP | 2002-325410 A | | 11/2002 |
| JP | 2004-96803 A | | 3/2004 |
| JP | 2004-153886 A | | 5/2004 |
| JP | 2004153886 A | * | 5/2004 |
| JP | 2004-222410 A | | 8/2004 |
| JP | 2005-102475 A | | 4/2005 |
| JP | 2006-271057 A | | 10/2006 |
| JP | 2007-259541 A | | 10/2007 |
| JP | 2007259541 A | * | 10/2007 |
| JP | 2009-017669 A | | 1/2009 |
| JP | 2010-284022 A | | 12/2010 |
| WO | 2009/063696 A1 | | 5/2009 |

OTHER PUBLICATIONS

Machine translation of JP 2004-153886 A.*
1st Japanese Office Action dated Mar. 8, 2016 in the corresponding JP application No. 2015-521375. (English translation attached).
Final rejection of Office Action dated Sep. 6, 2016 in the corresponding JP application No. 2015-521375. (English translation attached).
Extended European Search Report dated Jan. 23, 2017 in the corresponding EP application No. 14807169.9.
Chinese Office Action dated Feb. 27, 2017 in the corresponding CN application No. 201480026799.X (English translation attached).
Indonesian Office Action dated Mar. 20, 2017 in the corresponding ID application No. P00201507839. (English translation attached).
Office Action dated May 30, 2017 in the corresponding JP application No. 2015-521375 (English translation attached).
International Search Report of the International Searching Authority dated Aug. 12, 2014 for the corresponding international application No. PCT/JP2014/063321 (and English translation).
CN Office Action dated Aug. 29, 2017 in the corresponding CN patent application No. 201480026799.X (and full English machine translation attached).
Office action dated Jan. 21, 2019 issued in corresponding Indian patent application No. 7169/CHENP/2015 (and English translation thereof).

* cited by examiner

10-POLE/9-SLOT SYNCHRONOUS MOTOR

CROSS REFERENCE TO RELATED APPLICATIONS

The present application is a U.S. national stage of International Application No. PCT/JP2014/063321 filed on May 20, 2014 which claims priority to International Application No. PCT/JP2013/065330 filed on Jun. 3, 2013, the disclosures of which are incorporated herein by reference.

TECHNICAL FIELD

The present invention relates to a synchronous motor.

BACKGROUND

In a synchronous motor using a permanent magnet, particularly as for a motor in which stator windings are wound intensively around teeth, a ratio between the number of poles of the permanent magnet to be used for a rotor and the number of slots (that is, the number of teeth) of a stator is generally 2:3.

In the synchronous motor in which the ratio between the number of poles and the number of slots of the stator is 2:3, an opening is often provided between the adjacent teeth. The opening is provided to facilitate interlinkage of magnetic fluxes generated by a permanent magnet positioned in a rotor with stator windings, and to prevent that the magnetic fluxes generated because of an electric current flowing to the stator windings from short-circuiting in the stator without flowing to the rotor. However, near the opening, because magnetic flux density distribution in a gap between the stator and the rotor is disturbed, cogging torque is generated, and this cogging torque causes vibration and noise.

To reduce such cogging torque, in a conventional synchronous motor, a rotor having 8 or 10 poles and a stator having 9 slots are used, and three-phase windings are continuously and intensively positioned in the stator. In this type of synchronous motor, because nine windings are positioned in the stator, respective windings and teeth are mechanically positioned for every 40 degrees, and three windings of respective phases are mechanically positioned at an angle of 40 degrees continuously. Because the rotor has 8 poles or 10 poles, in the case of 8 poles, the width of one magnetic pole is 45°, and in the case of 10 poles, the width of one magnetic pole is 36°.

To be specific, pulsations generated while the rotor rotates once are determined by the least common multiple of the number of slots of the stator and the number of poles of the rotor. In a case where the synchronous motor having the ratio between the number of poles and the number of slots of the stator of 2:3 is an 8-pole/12-slot synchronous motor, the pulsations occur 24 times. Meanwhile, in an 8-pole/9-slot synchronous motor, the pulsations occur 72 times, and in a 10-pole/9-slot synchronous motor, the pulsations occur 90 times.

As described above, as the number of pulsations increases, energy of the cogging torque is distributed more, and thus the amplitude of the cogging torque decreases. That is, the 8-pole/9-slot or 10-pole/9-slot synchronous motor can suppress the cogging torque more than the synchronous motor in which the ratio between the number of poles and the number of slots of the stator is 2:3.

However, in the above-discussed conventional synchronous motor, because the winding constituting one phase is positioned continuously and intensively, a rotating field generated by distributing an electric current to the stator winding is generated unequally with respect to a rotary shaft of the rotor. Therefore, an attracting and repelling force between the permanent magnet of the rotor and the stator becomes unbalanced with respect to the rotary shaft, thereby generating a large excitation force in a radial direction. This excitation force causes vibration and noise.

SUMMARY

The present invention has been achieved in view of the above problems, and an object of the present invention is to provide a synchronous motor that can achieve lower vibration and lower noise.

In order to solve the problems and achieve the object, according to an aspect of the present invention, there is provided a 10-pole/9-slot synchronous motor including: nine teeth that are divided into three phases, each including three adjacent teeth, wherein a stator iron core is configured such that a value obtained by dividing b by a is larger than 0.5 where the a is a width of a teeth tip, which is provided on an inner diameter side of a tooth formed on the stator iron core, from a base portion between the teeth tip and the tooth to a circumferential end of the teeth tip and the b is a thickness of the teeth tip from the base portion to an inner-diameter side surface of the teeth tip.

According to the present invention, lower vibration and lower noise can be achieved.

DESCRIPTION OF EMBODIMENTS

Exemplary embodiments of a synchronous motor according to the present invention will be explained below in detail with reference to the accompanying drawings. The present invention is not limited to the embodiments.

First Embodiment

Figure 1:
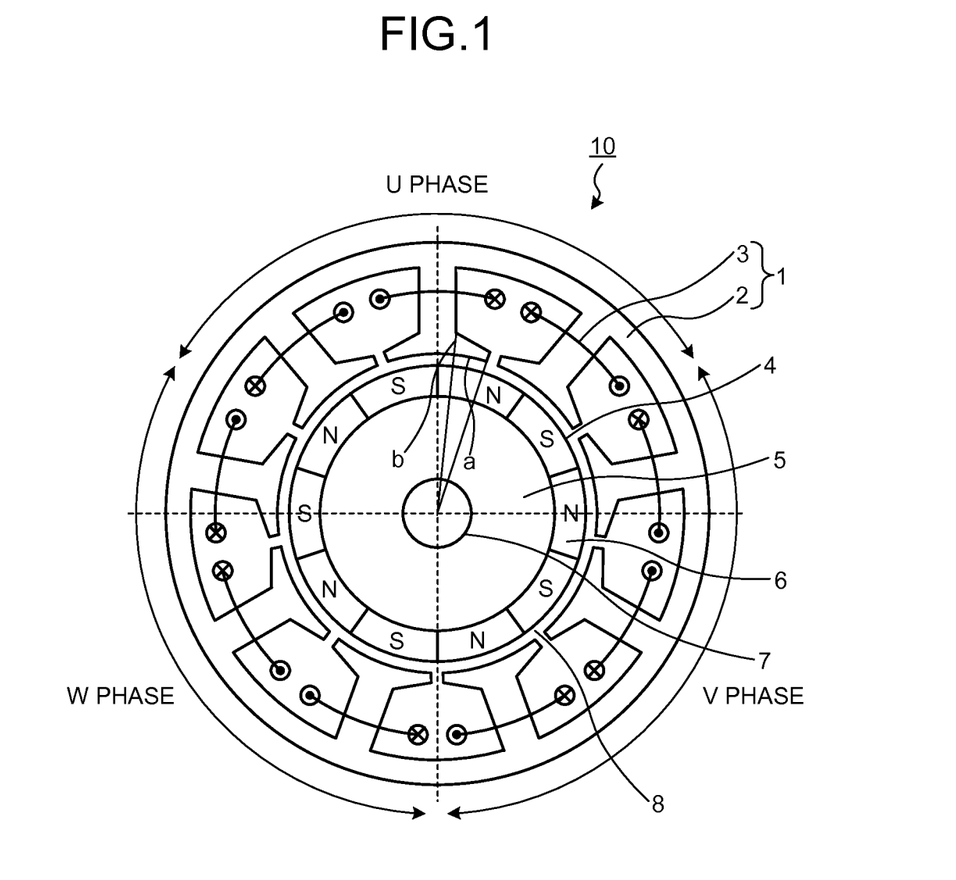
FIG. 1 is a horizontal sectional view of a synchronous motor according to a first embodiment of the present invention.
Figure 2:
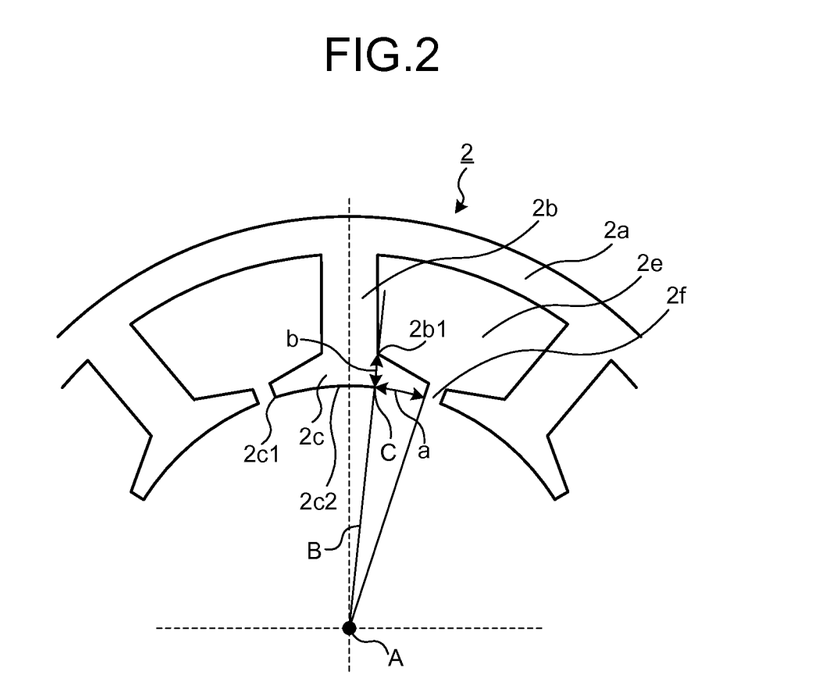
FIG. 2 is an enlarged view of relevant parts of the synchronous motor illustrated in FIG. 1.

FIG. 1 is a horizontal sectional view of a synchronous motor 10 according to a first embodiment of the present invention. FIG. 2 is an enlarged view of relevant parts of the synchronous motor 10 illustrated in FIG. 1.

FIG. 1 illustrates the synchronous motor 10 including a stator 1 and a rotor 4. The rotor 4 is positioned via an air gap 8 on an inner diameter side of the stator 1, and a rotary shaft 7 is provided at a center of the rotor 4. Permanent magnets 6 having different polarity are positioned alternately in a circumferential direction on an outer diameter surface of a yoke iron core 5 constituting the rotor 4. In the rotor 4 in the example illustrated in FIG. 1, the number of poles of the permanent magnets 6 is 10.

A relatively low-cost material having a low magnetic force is used for the permanent magnet 6, and, for example, a ferrite magnet is used for the permanent magnet 6. When the synchronous motor 10 is used for an air blower having a relatively small output, a regular sintered magnet is used for the permanent magnet 6. A bond magnet in which a mixed material of resin and magnetic particles is molded in a ring shape can be used for the permanent magnet 6. Because the ferrite magnet is cheaper than a rare-earth magnet, if the ferrite magnet is used as the permanent magnet 6, the excitation force described below can be reduced while achieving cost reduction.

The stator 1 includes a circularly-formed stator iron core 2 and windings 3 to which power from outside is supplied.

A plurality of teeth 2b positioned at a regular interval in the circumferential direction are formed on an inner periphery side of the stator iron core 2. In the stator 1 in the example illustrated in FIG. 1, nine teeth 2b are provided.

A slot 2e surrounded by a yoke iron core 2a, the teeth 2b, and a teeth tip (or tooth tip) 2c constituting the stator iron core 2 is formed at a portion where the stator 1. In the stator 1 in the example illustrated in FIG. 1, nine slots 2e are provided.

A slot opening 2f for inserting the windings 3 into the slot 2e is formed at the portion where the circumferential ends 2c1 of the adjacent teeth tips 2c face each other. The respective slot openings 2f have substantially the same width.

The windings 3 constituting the respective phases are intensively positioned on the three teeth 2b constituting a U phase, three teeth 2b constituting a V phase, and three teeth 2b constituting a W phase.

The direction of the winding 3 wound around the tooth 2b provided at the center, of the three teeth 2b constituting each phase, is in a direction opposite to the direction of the windings 3 wound around the teeth 2b provided on both sides thereof.

Furthermore, in the synchronous motor 10 according to the present embodiment, the stator 1 is configured as follows. For example, it is assumed that a central position of the stator 1 is "A", a line connecting the teeth 2b, a base portion 2b1 of the teeth tip 2c, and the central position A is "B", an intersection between an inner-diameter side surface 2c2 of the teeth tip 2c and the line B is "C", a width from the intersection C to the circumferential end 2c1 is "a", and a thickness from the base portion 2b1 to the intersection C is "b". In this example, the stator iron core 2 is configured such that a ratio of b to a (a value obtained by dividing the b by the a:b/a) is larger than 0.5. The reason the stator 1 is configured in this manner is described below.

Figure 3:
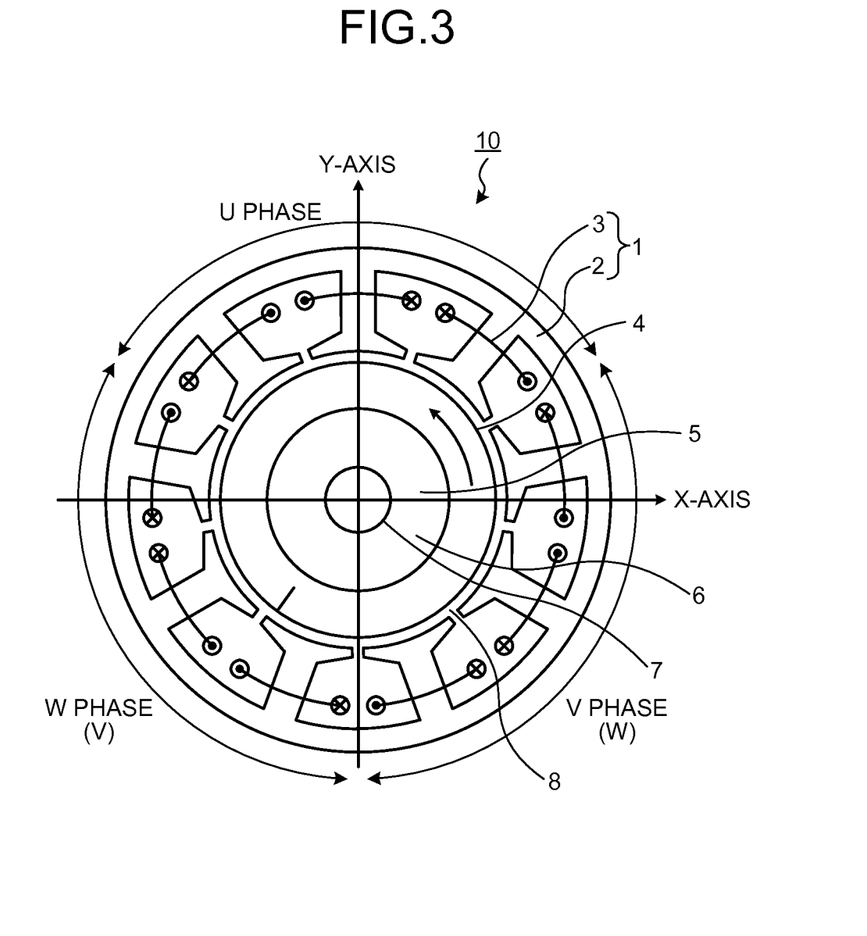
FIG. 3 is a horizontal sectional view of a synchronous motor in which an 8-pole or 10-pole rotor and a 9-slot stator are combined.
Figure 4:
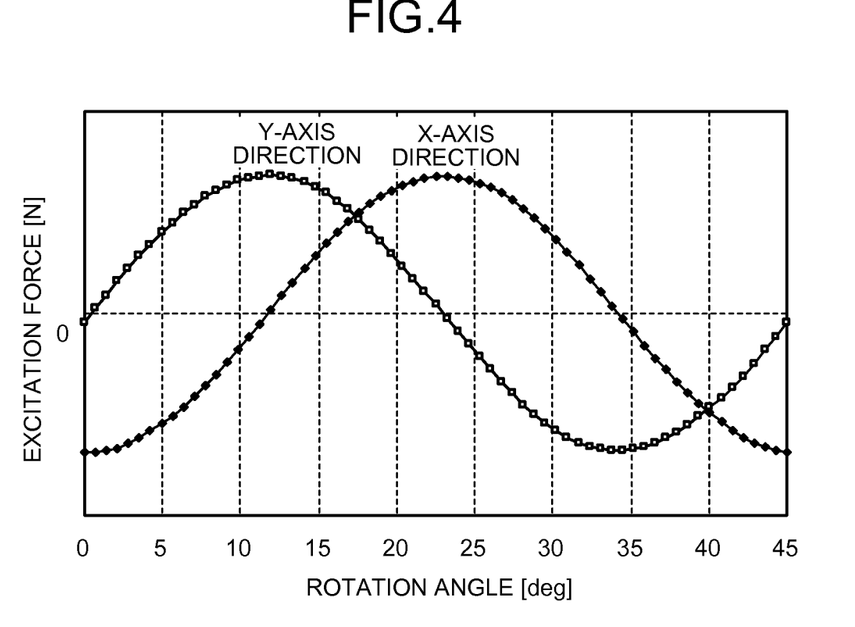
FIG. 4 is a diagram illustrating an excitation force of a rotor generated at the time of distributing a sine-wave current to a synchronous motor using an 8-pole rotor.

FIG. 3 is a horizontal sectional view of a synchronous motor in which an 8-pole or 10-pole rotor and a 9-slot stator are combined. FIG. 4 is a diagram illustrating an excitation force of a rotor generated at the time of distributing a sine-wave current to a synchronous motor using an 8-pole rotor.

As described above, in the synchronous motor in which a combination of the number of poles and the number of slots is 10-pole/9-slot or 8-pole/9-slot, the winding 3 constituting one phase is intensively positioned. Therefore, a rotating field generated when a current flows to the winding 3 of the stator 1 is generated unequally with respect to the rotary shaft 7 of the rotor 4. Accordingly, a large excitation force (a magnetic attractive force) is generated in the radial direction with respect to the rotary shaft 7.

As illustrated in FIG. 3, the rotor 4 rotates in the anti-clockwise direction. In the synchronous motor 10, a current flows to the winding 3 of each phase of the stator 1, while matching with a position of the magnetic pole, thereby generating torque. When it is assumed that a lateral direction of the synchronous motor 10 is an X-axis and a vertical direction of the synchronous motor 10 is a Y-axis, as the excitation force generated at the time of rotation of the rotor 4 is obtained by a magnetic field analysis, the result thereof is as illustrated in FIG. 4.

A curved line illustrated in FIG. 4 represents an excitation force generated when a sine-wave current is caused to flow to the winding 3 of the 8-pole/9-slot synchronous motor. As in the example illustrated in FIG. 4, the excitation force generated in the rotor 4 changes substantially sinusoidally with respect to the X-axis or the Y-axis, while matching with the rotation of the rotor 4. Therefore, in the 8-pole/9-slot synchronous motor, when the rotor 4 rotates once, the excitation force fluctuating sinusoidally is generated eight times. In the 10-pole/9-slot synchronous motor illustrated in FIG. 1, when the rotor 4 rotates once, the excitation force fluctuating sinusoidally is generated ten times.

Figure 5:
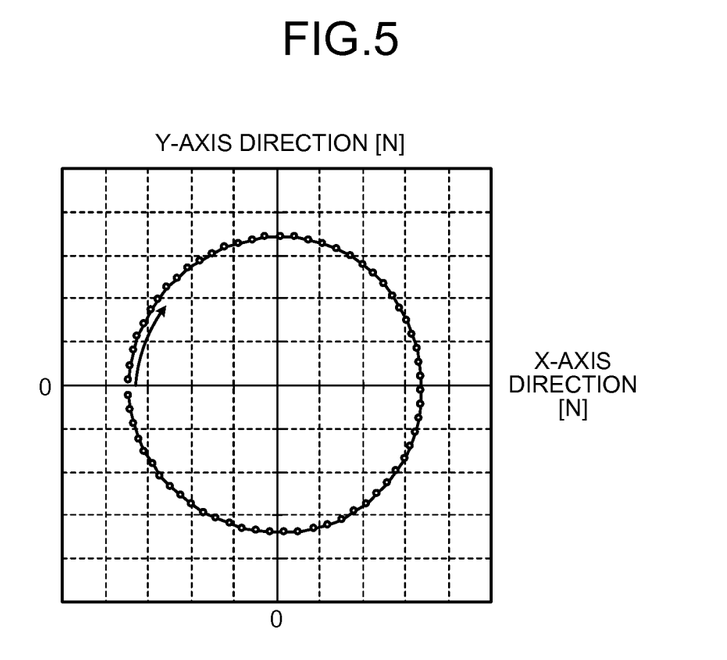
FIG. 5 is a diagram illustrating a trajectory of an excitation force generated in the rotor of the synchronous motor illustrated in FIG. 3.

FIG. 5 is a diagram illustrating a trajectory of an excitation force generated in the rotor of the synchronous motor illustrated in FIG. 3. In order to ascertain the size and direction of the excitation force, when the excitation force in the X-axis direction in FIG. 3 is plotted on an x-axis and the excitation force in the Y-axis direction is plotted on a y-axis, the excitation force draws a substantially circular trajectory as in the example illustrated in FIG. 5, and is generated while changing a direction with a substantially constant force, while matching with the rotation of the rotor 4. The size of the excitation force in the radial direction indicates an inclination such that the excitation force increases according to the torque output by the synchronous motor 10.

Figure 6:
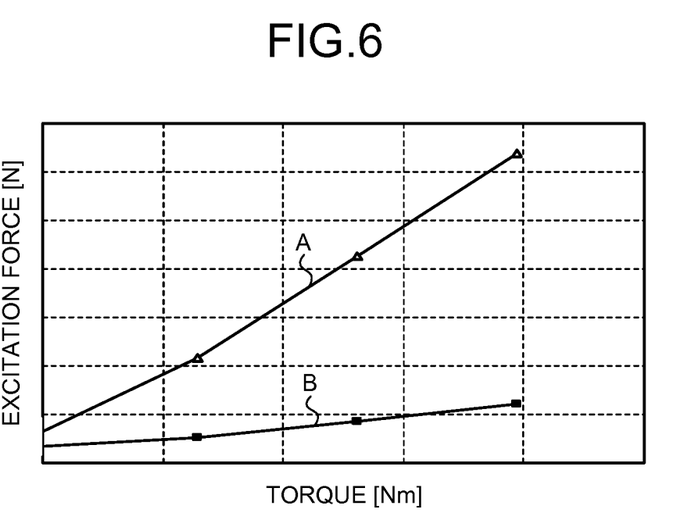
FIG. 6 is a diagram illustrating a relation between torque and an excitation force generated in a synchronous motor.

FIG. 6 is a diagram illustrating a relation between torque and an excitation force generated in a synchronous motor.

Figure 7:
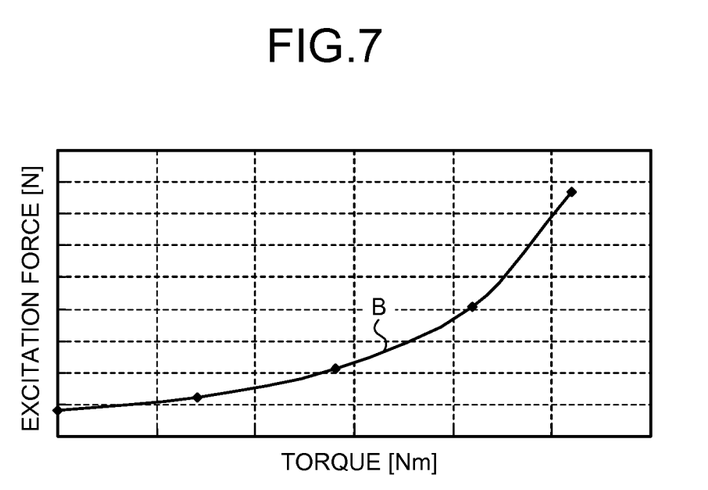
FIG. 7 is a diagram illustrating a relation between torque and an excitation force generated in a 10-pole/9-slot synchronous motor.

FIG. 7 is a diagram illustrating a relation between torque and an excitation force generated in a 10-pole/9-slot synchronous motor.

In FIG. 6, a curved line A representing a relation between the torque and the excitation force in the 8-pole/9-slot synchronous motor, and a curved line B representing a relation between the torque and the excitation force in the 10-pole/9-slot synchronous motor are illustrated. In these synchronous motors, a stator having the same shape (9 slots) is used. Further, the permanent magnet 6 having an equal magnetic force is used for the rotor 4 of these synchronous motors.

Because the absolute value of the excitation force is different depending on the size and output torque of the motor, in FIG. 6, only inclinations of the excitation force generated in the 8-pole/9-slot synchronous motor and of the 10-pole/9-slot synchronous motor are illustrated, and specific numerical values are omitted.

As illustrated in FIG. 6, both the excitation force in the 10-pole/9-slot synchronous motor and the excitation force in the 8-pole/9-slot synchronous motor increase in proportion to generated torque. However, the excitation force in the 10-pole/9-slot synchronous motor is sufficiently small as compared to the excitation force in the 8-pole/9-slot synchronous motor, and indicates one fourth or less of the excitation force in the 8-pole/9-slot synchronous motor.

To facilitate understanding of a change of the curved line B in FIG. 6, scale marks of the vertical axis of FIG. 7 are set to be different from those of FIG. 6. As illustrated in FIG. 7, the excitation force in the 10-pole/9-slot synchronous motor 10 exhibits a characteristic close to a quadratic function with respect to the generated torque. In this manner, in the 10-pole/9-slot synchronous motor 10, there is an inclination such that the excitation force of the rotor 4 rapidly increases with an increase of the torque. It is assumed that the inclination is affected by the magnetic flux density of the stator iron core 2.

Figure 8:
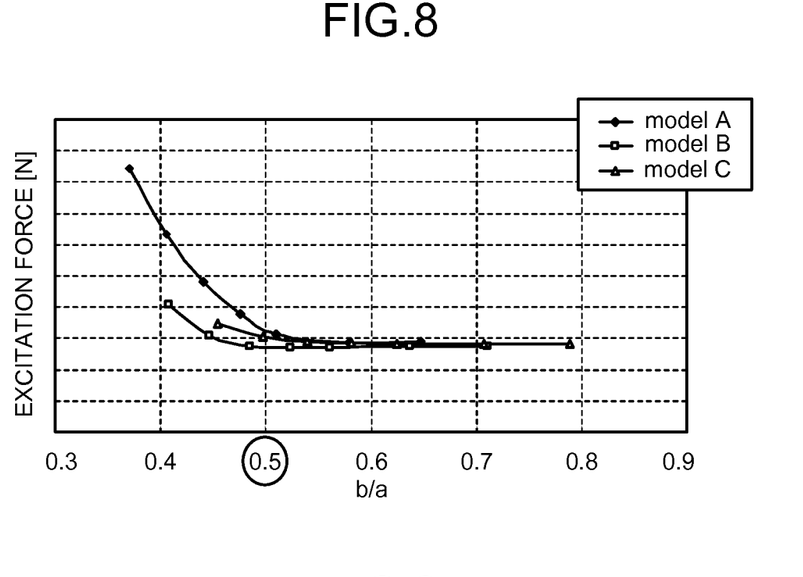
FIG. 8 is a diagram illustrating a relation between the size of a stator iron core and an excitation force in a 10-pole/9-slot synchronous motor.

FIG. 8 is a diagram illustrating a relation between the size of a stator iron core and an excitation force in a 10-pole/9-slot synchronous motor. The size of the stator iron core 2 described above (b/a) is plotted on the horizontal axis, and the excitation force is plotted on the vertical axis. The torque generated at this time corresponds to a rated output of the synchronous motor 10.

A plurality of curved lines illustrated in FIG. 8 exhibits the result of a magnetic field analysis of the synchronous motor, in which the thickness b of the teeth tip 2c is set to a fixed value, and the width of the slot opening 2f (that is, the width a of the teeth tip 2c) is set to a different value.

Among the three types of curved lines, a curved line of "model A" is of a synchronous motor having the widest width a of the teeth tip 2c, and a curved line of "model C" is of a synchronous motor having the narrowest width a of the teeth tip 2c. That is, the width a of the teeth tip 2c becomes narrower in order of "model A", "model B", and "model C". In other words, the model having the smallest size of the slot opening 2f is "model A", and the model having the largest size of the slot opening 2f is "model C".

In a region in which the value of b/a is large to some extent (for example, in a region equal to or larger than 0.5), the excitation force exhibits a substantially constant value. On the other hand, in a region in which the value of b/a is smaller than 0.5, there is an inclination such that as the value of b/a decreases, the excitation force increases. Therefore, by configuring the stator iron core 2 so that the value of b/a is equal to or larger than 0.5, the excitation force can be reduced.

Figure 9:
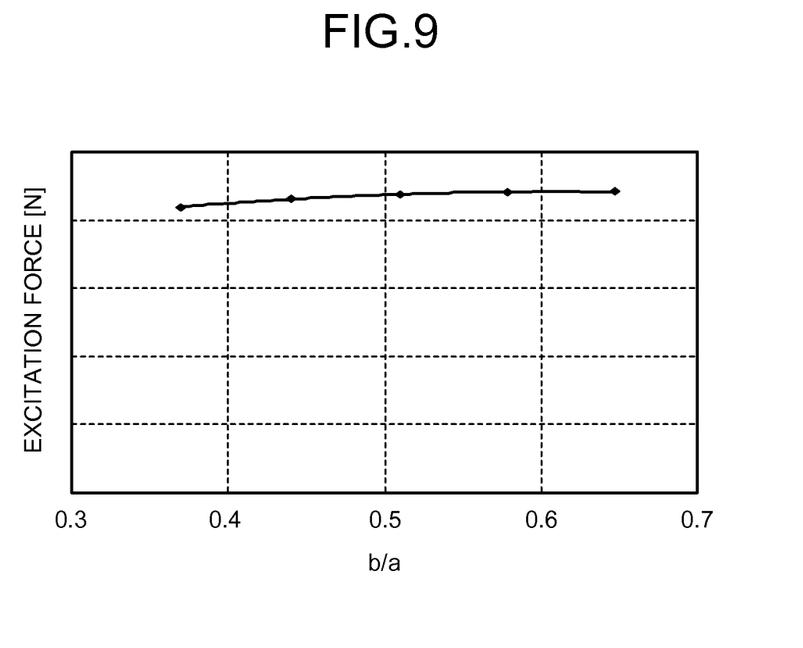
FIG. 9 is a diagram illustrating a relation between the size of a stator iron core and an excitation force in an 8-pole/9-slot synchronous motor.

FIG. 9 is a diagram illustrating a relation between the size of a stator iron core and an excitation force in an 8-pole/9-slot synchronous motor. Similarly to FIG. 8, the size of the stator iron core 2 described above (b/a) is plotted on the horizontal axis, and the excitation force is plotted on the vertical axis. The torque generated at this time corresponds to a rated output of the synchronous motor 10. The shape of the stator 1 is the same as that of "model A" in FIG. 8.

In the case of the 8-pole/9-slot synchronous motor, it can be understood that, even if the value of b/a is changed, the value of the excitation force hardly changes, and even if the shape of a portion of the stator iron core 2 facing the rotor 4 is changed, the excitation force hardly changes. As is obvious from FIG. 8 and FIG. 9, the 10-pole/9-slot synchronous motor can suppress the excitation force of the rotor 4 by adjusting the value of b/a to an optimum value.

In the synchronous motor in which the ratio between the number of poles and the number of slots of the stator is 2:3, when the windings 3 of the same phase are positioned symmetrically to a rotary shaft, the magnetic attractive force negates each other with respect to the rotary shaft, and thus the excitation force of the rotor as described above is not generated. Therefore, in the synchronous motor 10 configured in this manner, even if the size of the stator iron core 2 is set as described above, there is no change in the excitation force, and similar effects cannot be acquired.

As described above, the synchronous motor 10 according to the present embodiment is the 10-pole/9-slot synchronous motor 10 having nine teeth 2b that are divided into three phases, each having three adjacent teeth, and when it is assumed that the width of the teeth tip 2c, which is provided on the inner diameter side of the tooth 2b formed on the stator iron core 2, from the base portion 2b1 between the teeth tip 2c and the tooth 2b to the circumferential end 2c1 of the teeth tip 2c is "a", and the thickness of the teeth tip 2c from the base portion 2b1 to the inner-diameter side surface 2c2 of the teeth tip 2c is "b", the stator iron core 2 is configured such that a value obtained by dividing the b by the a is larger than 0.5. By setting the value of b/a to be large, the excitation force can be reduced in the 10-pole/9-slot synchronous motor 10 regardless of the size of the slot opening 2f. As a result, in the 10-pole/9-slot synchronous motor 10, high torque can be achieved while suppressing an increase of vibration and noise.

Second Embodiment

Figure 10:
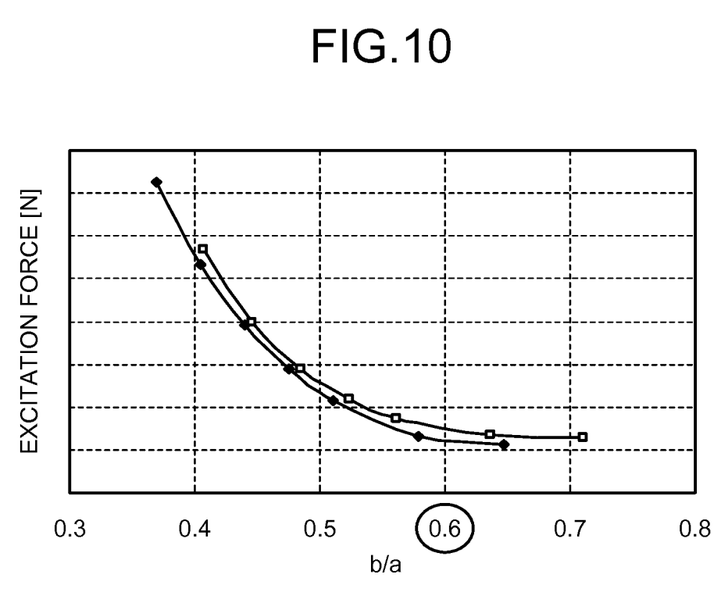
FIG. 10 is a diagram illustrating an excitation force of a synchronous motor according to a second embodiment of the present invention.

FIG. 10 is a diagram illustrating an excitation force of the synchronous motor 10 according to a second embodiment of the present invention. In the synchronous motor 10 according to the second embodiment, a rare-earth magnet is used as the permanent magnet 6 of the rotor 4, and the stator iron core 2 is configured such that b/a is larger than 0.6. The basic configuration of the synchronous motor 10 is identical to the configurations illustrated in FIG. 1 and FIG. 2, and thus illustrations of the configuration of the synchronous motor 10 are omitted here.

As the permanent magnet 6 according to the second embodiment, for example, a permanent magnet obtained by molding a bond magnet, in which magnetic particles of the rare-earth magnet and resin are mixed, in a ring shape is used. Because the rare-earth magnet is expensive as compared to a ferrite magnet, it is desired to form the permanent magnet 6 in a thin ring shape in order to suppress the material cost.

Furthermore, the rotor 4 according to the second embodiment is configured such that the amount of interlinkage magnetic flux with respect to the stator 1 having the same shape is about 1.5 times the amount thereof in the case of using a ferrite magnet. Therefore, the amount of magnetic flux generated in the rotor 4 and flowing to the stator 1 is larger than that of the first embodiment. Accordingly, in the synchronous motor 10 according to the second embodiment, the magnetic flux density of a portion of the stator 1 facing the rotor 4 is increased as compared to the synchronous motor 10 according to the first embodiment. As a result, the excitation force generated in the rotor 4 increases more than that of the first embodiment.

However, because the synchronous motor 10 according to the second embodiment is configured such that the value of b/a is larger than 0.6, as illustrated in FIG. 10, the excitation force can be reduced relatively. That is, by setting the value of b/a to be a value larger than 0.6, the excitation force generated in the rotor 4 of the synchronous motor 10 according to the second embodiment can be suppressed to the same level of excitation force generated in the rotor 4 of the synchronous motor 10 according to the first embodiment. In this manner, when the permanent magnet 6 having a high magnetic force is used for the rotor 4, the excitation force generated in the rotor 4 can be suppressed to be low by setting the value of b/a matched therewith.

As described above, in the synchronous motor 10 according to the second embodiment, by using the permanent magnet 6 having a high magnetic force and setting the value of b/a to a value larger than 0.6, high output and high efficiency can be achieved while suppressing the excitation force of the rotor 4. As a result, improvement of the efficiency by achieving a high magnetic force can be realized, in addition to the effects of the first embodiment (low vibration and low noise).

Third Embodiment

Figure 11:
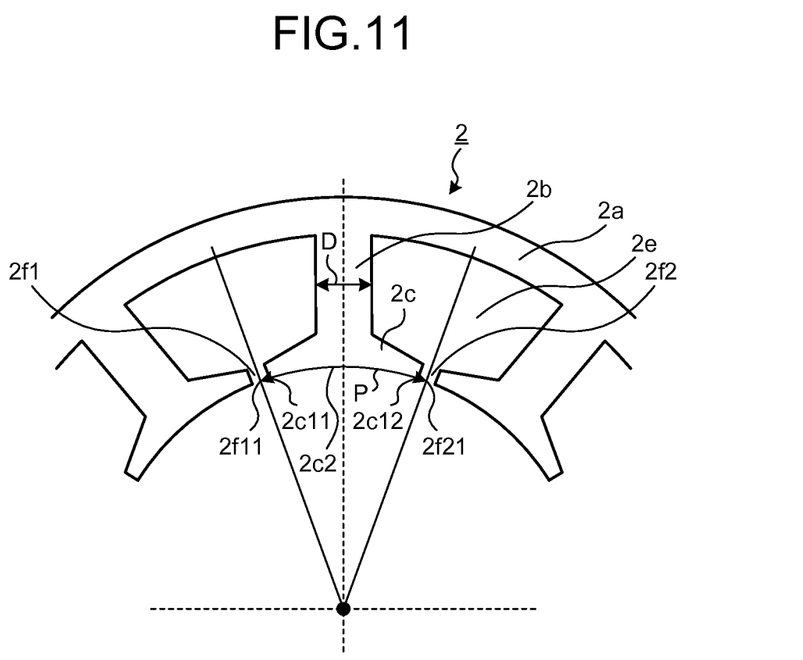
FIG. 11 is a sectional view of a synchronous motor according to a third embodiment of the present invention, in which relevant parts are enlarged.

FIG. 11 is a sectional view of the synchronous motor 10 according to a third embodiment of the present invention, in which relevant parts are enlarged. The basic configuration of the synchronous motor 10 is identical to the configurations illustrated in FIG. 1 and FIG. 2, and thus illustrations of the basic configuration of the synchronous motor 10 are omitted here. The stator iron core 2 of the synchronous motor 10 according to the third embodiment is formed so that the value of b/a is larger than 0.5 as in the synchronous motor 10 according to the first and second embodiments, and a teeth width D, being a width of a portion of the stator 1 (the tooth 2b), around which the winding 3 is wound, and a slot pitch P have a relation of D/P<0.5. That is, a value obtained by dividing the teeth width D by the slot pitch P is smaller than 0.5. The slot pitch P represents a length between circumferential centers of two adjacent slot openings 2f. Specifically, the slot pitch P has a value obtained by adding a length from one circumferential end 2c11 of the teeth tip 2c of the tooth 2b illustrated in FIG. 11 to a circumferential center 2f11 of one slot opening 2f1, a length from the other circumferential end 2c12 of the teeth tip 2c to a circumferential center 2f21 of the other slot opening 2f2, and a circumferential width of the inner-diameter side surface 2c2 of the teeth tip 2c. In the following descriptions, a value obtained by dividing the teeth width D by the slot pitch P is referred to as "value of D/P", unless otherwise specified.

Figure 12:
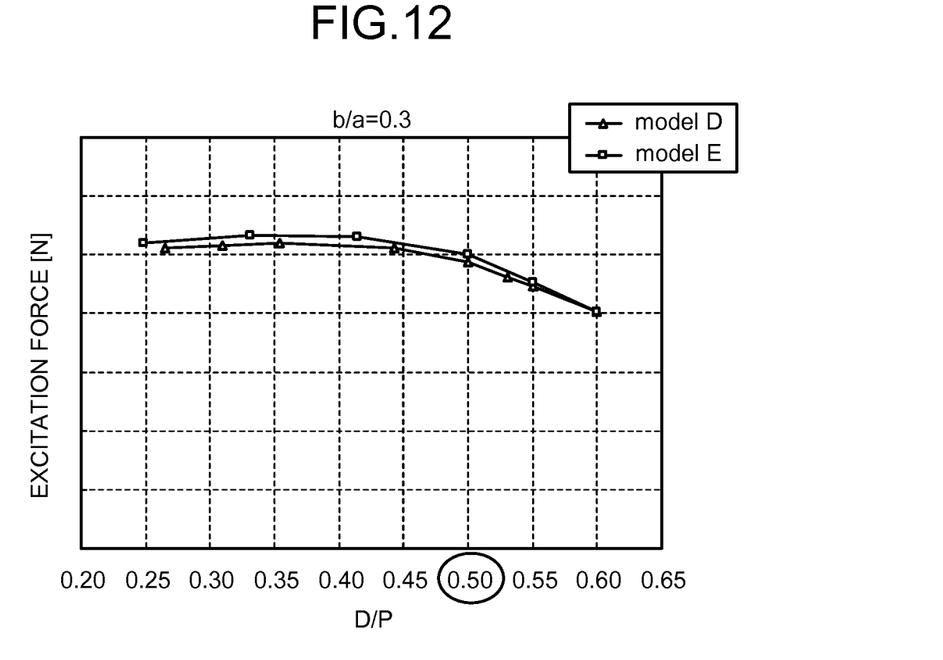
FIG. 12 is a diagram illustrating a relation between the value of D/P and an excitation force when the value of b/a is set to 0.3.
Figure 13:
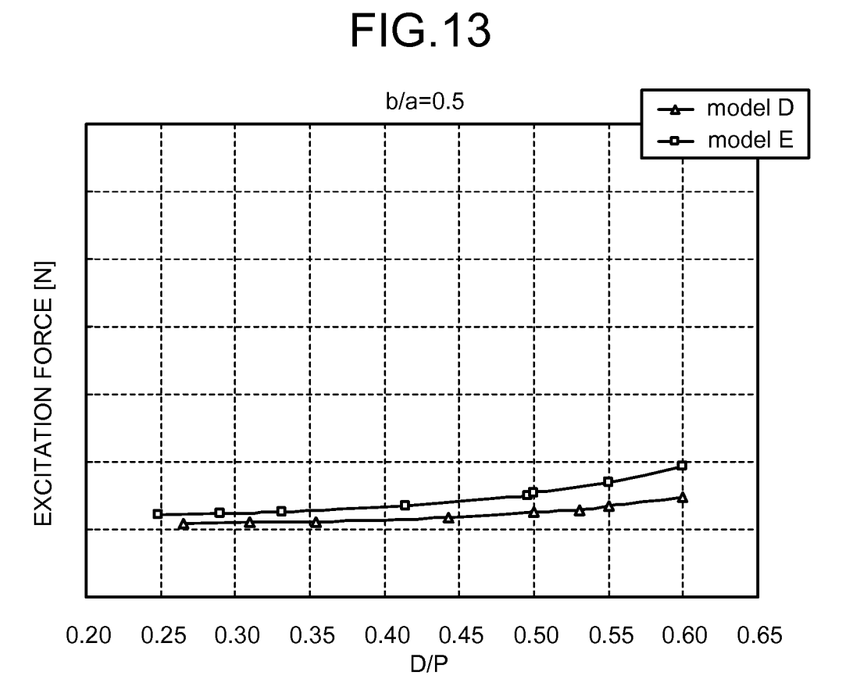
FIG. 13 is a diagram illustrating a relation between the value of D/P and an excitation force when the value of b/a is set to 0.5.
Figure 14:
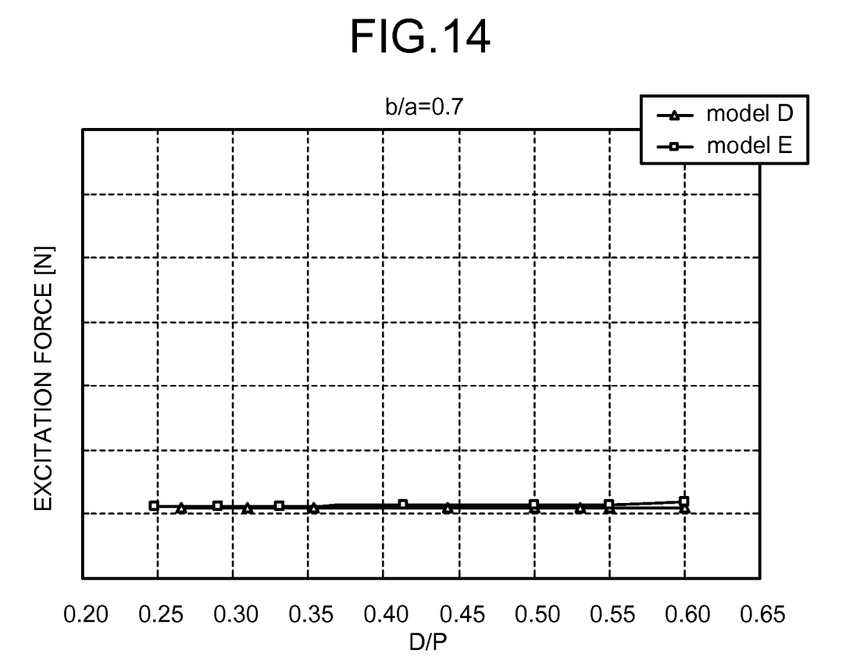
FIG. 14 is a diagram illustrating a relation between the value of D/P and an excitation force when the value of b/a is set to 0.7.

FIG. 12 is a diagram illustrating a relation between the value of D/P and an excitation force when the value of b/a is set to 0.3. FIG. 13 is a diagram illustrating a relation between the value of D/P and an excitation force when the value of b/a is set to 0.5. FIG. 14 is a diagram illustrating a relation between the value of D/P and an excitation force when the value of b/a is set to 0.7. In FIG. 12 to FIG. 14, the value of D/P is plotted on the horizontal axis, and the excitation force is plotted on the vertical axis. The torque generated in this case corresponds to a rated output of the synchronous motor.

Two types of curved lines illustrated in the respective diagrams are of synchronous motors having a different size of the slot opening 2f. For example, the size of the slot opening 2f in the synchronous motor indicated by a curved line of "model D" is wider than the size of the slot opening 2f in the synchronous motor indicated by a curved line of "model E".

As illustrated in FIG. 12, when the value of b/a is 0.3, in a region where the value of D/P is small to some extent (in a region where the value of D/P is smaller than 0.5), the excitation force exhibits substantially a constant value. On the other hand, in a region larger than this small region, there is exhibited an inclination such that, as the value of D/P increases, the excitation force decreases.

On the other hand, as illustrated in FIG. 13 and FIG. 14, when the value of b/a is larger than 0.3, the excitation force in the region where the value of D/P is smaller than 0.5, and the excitation force in the region where the value of D/P is equal to or larger than 0.5 have substantially a constant value, regardless of the value of D/P.

According to the data illustrated in FIG. 12 to FIG. 14, as the value of D/P increases, that is, as the value of the teeth width D approaches the value of the slot pitch P, the excitation force can be decreased without increasing the value of b/a.

However, as the value of the teeth width D approaches the value of the slot pitch P, a sectional area of the slot 2e decreases. Therefore, fine windings 3 need to be wound around the teeth 2b, and thus the resistance of the winding 3 increases and a loss (a copper loss) generated due to the current flowing to the winding 3 increases. Particularly in a case of a synchronous motor for an air blower, the synchronous motor is frequently used under load conditions of low rotation and high torque. Therefore, a copper loss accounts for a large percentage of the loss, and thus, in order to improve the efficiency of the synchronous motor, it is required to set the sectional area of the slot 2e to be large, and suppress the resistance of the winding 3 to be low. Consequently, there is an inclination such that the value of the teeth width D inevitably decreases in order to set the sectional area of the slot 2e to be large. In the synchronous motor configured such that the value of the teeth width D is decreased so that, for example, the value of D/P is smaller than 0.5, as illustrated in FIG. 12, if the value of b/a is set to a value smaller than 0.5 (0.3 in the illustrated example), the excitation force increases.

Therefore, in the synchronous motor configured such that the value of D/P is smaller than 0.5, by setting the value of b/a to a value larger than 0.5, high output and high efficiency can be achieved while suppressing the excitation force. Particularly, in a 10-pole/9-slot synchronous motor configured such that the value of D/P is smaller than 0.5, the reduction effect of the excitation force by setting the value of b/a to a value larger than 0.5 is large.

In the synchronous motors 10 according to the first and second embodiments, the value of D/P is 0.35, and the value of b/a is larger than 0.5 or 0.6. For example, when the synchronous motor 10 is used for an air blower, a synchronous motor having excellent efficiency, small excitation force, low vibration, and low noise can be realized.

As described above, in the 10-pole/9-slot synchronous motor 10 according to the present embodiment, when it is assumed that the width of the teeth 2b, around which the winding 3 is wound, is D, and the slot pitch between the two adjacent slot openings 2f1 and 2f2 is P, the stator iron core 2 is formed so that a value obtained by dividing the b by the a is larger than 0.5, and a value obtained by dividing the D by the P is smaller than 0.5. According to the configuration, the excitation force can be suppressed, and the sectional area of the slot 2e can be increased. Consequently, an increase of the copper loss in the winding 3 can be suppressed, and high output and high efficiency can be achieved.

The stator iron core 2 of the synchronous motor 10 according to the first to third embodiments is formed so that as the value of a increases, the value of b increases, and the value obtained by dividing the b by the a is larger than 0.5, so as to suppress an increase of the magnetic flux density in the region from the base portion 2b1 to the circumferential end 2c1. This configuration is described below more specifically. In the conventional technique in Patent Literature 1, an H/P ratio and an S/P ratio are decreased more than those of other conventional techniques to positively cause magnetic saturation of a magnetic path at a tip of a magnetic pole tooth, thereby decreasing the magnetic flux leaking to an adjacent tip portion without passing a dedendum of the tooth. That is, in the conventional technique in Patent Literature 1, the size from a base of the dedendum to an inner circumference of the tip portion is relatively decreased to positively cause magnetic saturation of the magnetic path at the tip portion of the magnetic pole tooth, thereby decreasing the magnetic flux leaking to the adjacent tip portion without passing the dedendum and improving torque linearity. As illustrated in FIG. 2, it is desired to wind the winding 3 in the slot 2e as much as possible by increasing the width from the base portion 2b1 of the teeth tip 2c to the circumferential end 2c1. However, as the width a from the intersection C to the circumferential end 2c1 (see FIG. 1) increases, the magnetic flux flowing in the region from the circumferential end 2c1 to the base portion 2b1 of the teeth tip 2c relatively increases, to increase the magnetic flux density in this region and thus the magnetic flux can hardly pass through to the tooth 2b. As described above, in the 10-pole/9-slot synchronous motor, there is an inclination such that the excitation force of the rotor 4 increases rapidly with an increase of the torque. That is, there is an inclination such that the excitation force increases as the magnetic flux density in the region (in the region from the circumferential end 2c1 to the base portion 2b1 of the teeth tip 2c) described above increases. It is supposed that this inclination is due to the magnetic flux density of the stator iron core 2. The conventional technique in Patent Literature 1 is configured such that the size from the base of the dedendum to the inner circumference of the tip portion is relatively decreased to positively cause magnetic saturation of the magnetic path at the tip portion of the magnetic pole tooth, that is, to increase the magnetic flux density, in order to improve the torque linearity. On the other hand, the 10-pole/9-slot synchronous motor 10 according to the first to third embodiments of the present invention is formed so that the value of b increases with an increase of the value of a, and the value obtained by dividing the b by the a is larger than 0.5 so as to suppress an increase of the magnetic flux density in the region from the base portion 2b1 to the circumferential end 2c1, as a measure for suppressing an increase of the excitation force caused by an increase of the magnetic flux density in the region.

The above embodiments of present invention are only examples of the contents of the present invention. These embodiments can be combined with other well-known techniques, and it is needless to mention that the present invention can be configured while modifying it without departing from the scope of the invention, such as omitting a part of constituent elements in these embodiments.

INDUSTRIAL APPLICABILITY

As described above, the present invention is applicable as a synchronous motor.

The invention claimed is:

1. A 10-pole/9-slot synchronous motor, the excitation force of which in a radial direction is reduced, comprising:
   a rotor including ten permanent magnets that are positioned in a circumferential direction on an outer diameter surface thereof; and
   a stator provided on an outer diameter surface side of the rotor via an air gap, wherein
   the stator includes:
      a circularly-formed stator iron core;
      nine teeth that are provided on an inner periphery of the circularly-formed stator iron core and positioned at regular intervals in a circumferential direction of the circularly-formed stator iron core; and
      nine tooth tips, which are provided on radially inner ends of the teeth, respectively, and have a structure extending from circumferential ends of the teeth, respectively, in a circumferential direction,
   the circularly-formed stator iron core is configured such that, for each tooth and corresponding tooth tip, a value obtained by dividing b by a is larger than 0.5 where a is a width of the tooth tip, from a base portion of the tooth tip to a circumferential end of the tooth tip, and b is a thickness of the tooth tip from the base portion to a radially-inner surface of the tooth tip, and
   the circularly-formed stator iron core is formed so that a value obtained by dividing D by P is within a range from 0.25 to 0.4, where D is a width of the tooth, around which a winding is wound, and P is a slot pitch between two adjacent slot openings, wherein the slot pitch P is measured at the radially-inner surface of the tooth tip, which faces the outer diameter surface of the rotor, and wherein P has a value obtained by adding:
   a length in the circumferential direction from one circumferential end of the tooth tip of the tooth to a circumferential center of one slot opening of the two adjacent slot openings,
   a length in the circumferential direction from the other circumferential end of the tooth tip to a circumferential center of the other slot opening of the two adjacent slot openings, and
   a circumferential width of the radially-inner surface of the tooth tip.

2. The 10-pole/9-slot synchronous motor according to claim 1, wherein a ferrite magnet is used for the permanent magnet of the rotor.

3. The 10-pole/9-slot synchronous motor according to claim 1, wherein
   a rare-earth magnet is used for the permanent magnet of the rotor, and
   the circularly-formed stator iron core is formed so that a value obtained by dividing b by a is larger than 0.6.

4. The 10-pole/9-slot synchronous motor according to claim 1, wherein the circularly-formed stator iron core is formed so that as a value of a increases, a value of b increases, and the value obtained by dividing b by a is larger than 0.5, to suppress an increase of magnetic flux density in a region from the base portion to the circumferential end.

5. A 10-pole/9-slot synchronous motor, the excitation force of which in a radial direction is reduced, comprising
a rotor including ten permanent magnets that are positioned in a circumferential direction on an outer diameter surface thereof; and
a stator provided on an outer diameter surface side of the rotor via an air gap, wherein the stator comprises:
a circularly-formed stator iron core;
nine teeth that are provided on an inner periphery of the circularly-formed stator iron core and positioned at regular intervals in a circumferential direction of the circularly-formed stator iron core; and
nine tooth tips that are provided on radially inner ends of the teeth, respectively, and that extend from circumferential ends of the teeth in a circumferential direction, respectively, wherein
a central position of the stator in the radial direction is A, and
for each tooth and corresponding tooth tip,
a line connecting a base portion between the tooth tip and the tooth and A is B,
an intersection between an inner-diameter side surface of the tooth tip and B is C,
a width from C to a circumferential end of the tooth tip is a, and
a thickness of the tooth tip from the base portion to C is b,
the circularly-formed stator iron core is configured such that a value of b increases with an increase of a value of a, and a value obtained by dividing b by a is in a range from 0.5 to 0.7 to suppress an increase of magnetic flux density in a region from the base portion to the circumferential end of the tooth tip, and
the circularly-formed stator iron core is formed so that, a value obtained by dividing D by P is within a range from 0.25 to 0.4 where the D is a width of the tooth, around which a winding is wound, and P is a slot pitch between two adjacent slot openings, wherein the slot pitch P is measured at the radially-inner surface of the tooth tip, which faces the outer diameter surface of the rotor, and wherein P has a value obtained by adding:
a length in the circumferential direction from one circumferential end of the tooth tip of the tooth to a circumferential center of one slot opening of the two adjacent slot openings,
a length in the circumferential direction from the other circumferential end of the tooth tip to a circumferential center of the other slot opening of the two adjacent slot openings, and
a circumferential width of the radially-inner surface of the tooth tip.

* * * * *